United States Patent [19]

Yanosy, Jr. et al.

[11] Patent Number: 4,792,941
[45] Date of Patent: Dec. 20, 1988

[54] DATA SUBSYSTEM TRAFFIC CONTROL APPARATUS AND METHOD

[75] Inventors: John A. Yanosy, Jr.; Paul Odlyzko, both of Stratford; Erramilli Ashok, Shelton; Hsiaosu Hsiung, Trumbull, all of Conn.

[73] Assignee: ITT Corporation, New York, N.Y.

[21] Appl. No.: 705,465

[22] Filed: Feb. 25, 1985

[51] Int. Cl.⁴ .............................................. H04Q 11/04
[52] U.S. Cl. ....................................... 370/58; 370/67; 370/85
[58] Field of Search ...................... 370/58, 85, 80, 94, 370/67, 88; 340/825.5, 825.51

[56] References Cited

U.S. PATENT DOCUMENTS

| 4,550,402 | 10/1985 | Gable et al. | 370/85 |
| 4,621,359 | 11/1986 | McMillen | 370/94 |
| 4,644,532 | 2/1987 | George et al. | 370/94 |

Primary Examiner—Douglas W. Olms
Assistant Examiner—Wellington Chin
Attorney, Agent, or Firm—Robert A. Walsh; Thomas N. Twomey; Mary C. Werner

[57] ABSTRACT

An apparatus for controlling data traffic throughout a communication network includes a plurality of network interface devices in each subsystem. The interface devices are substantially identical throughout the network and each autonomously controls all data traffic thereacross.

11 Claims, 17 Drawing Sheets

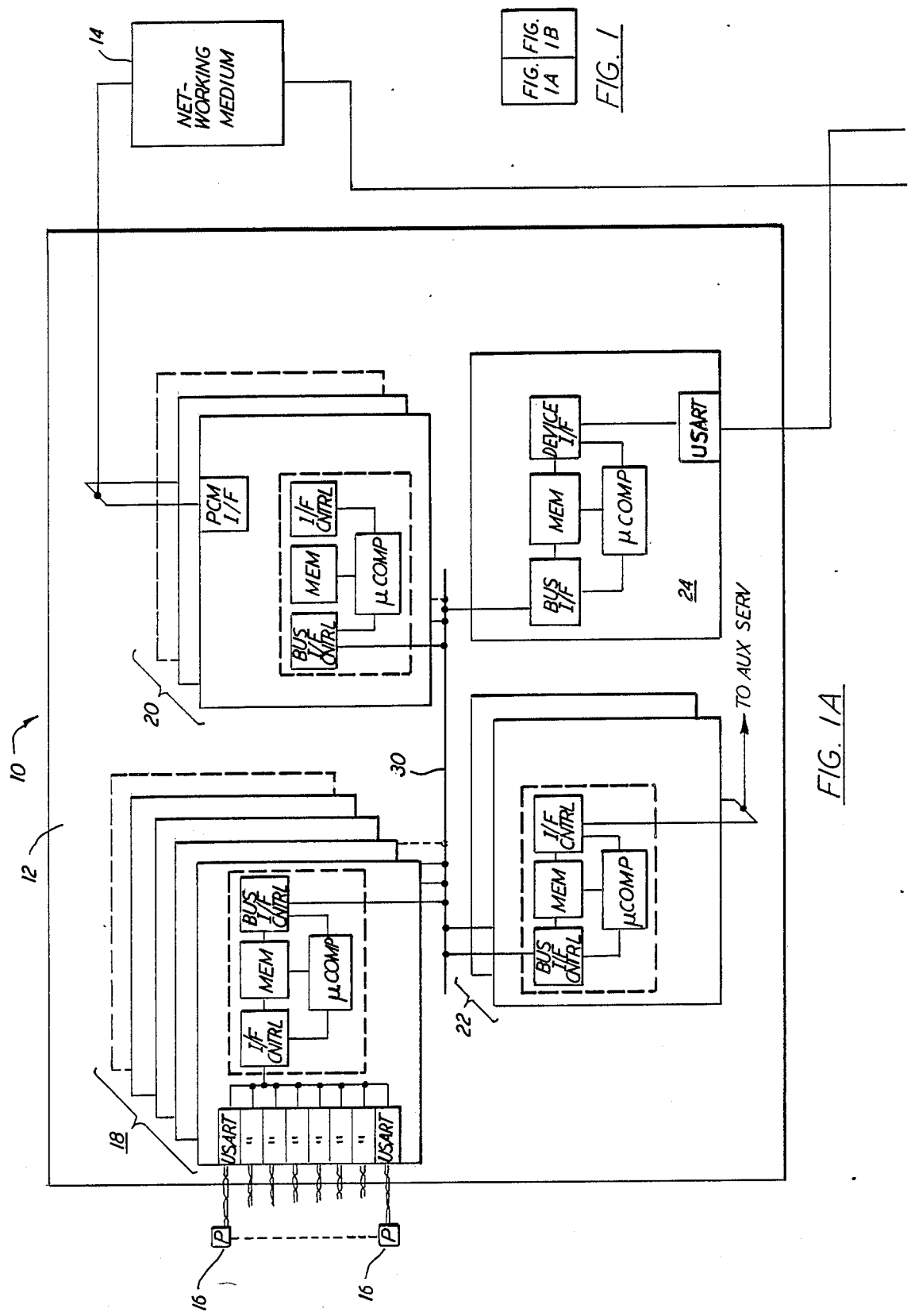

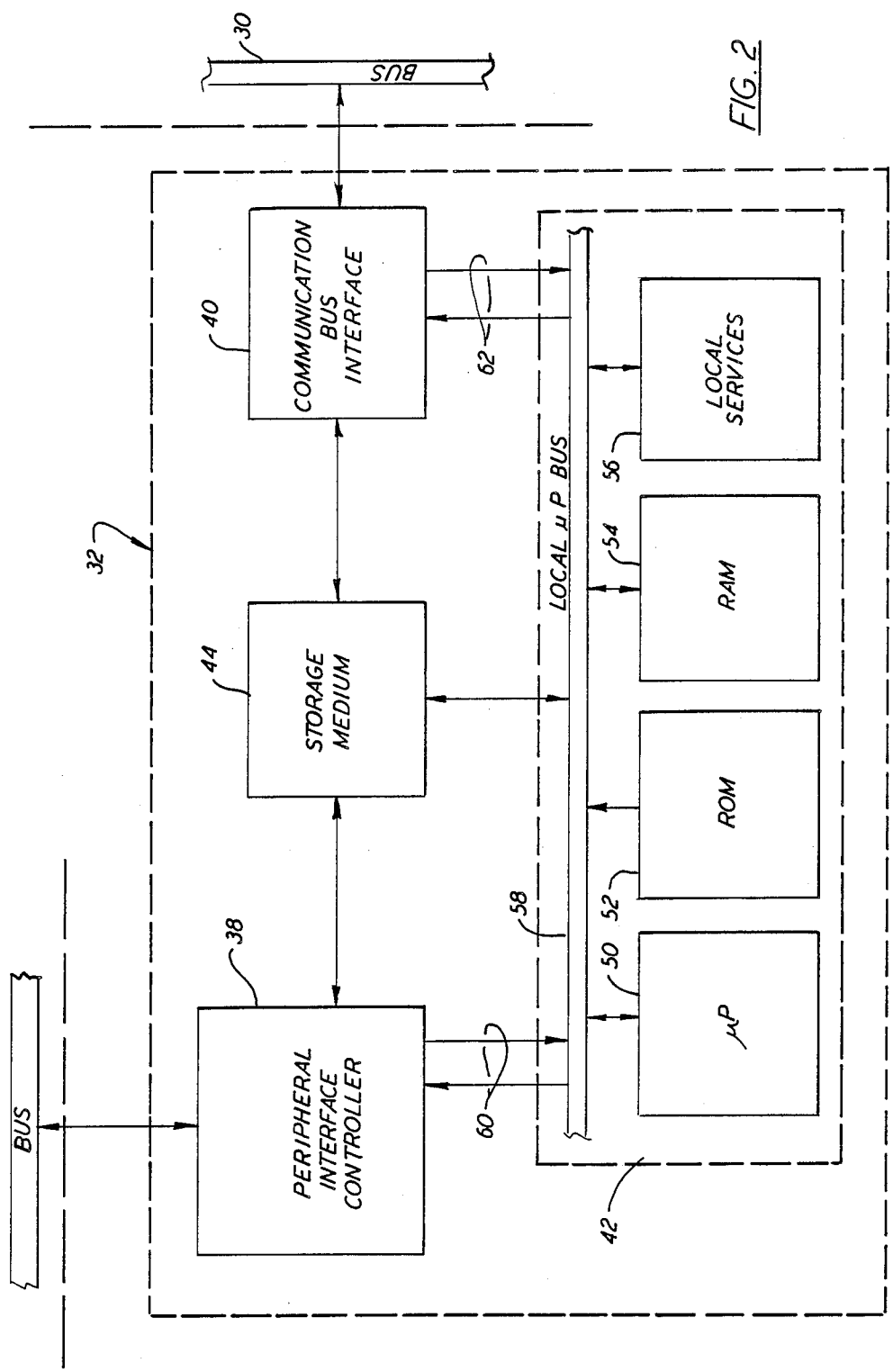

RATE ADAPTION

| PRESENT STATE | PRESENT STATE ACTION | MEANING | ENABLING PREDICATE | | NEXT STATE |
|---|---|---|---|---|---|
| | | | TRANSITION | CONDITION | |
| IDLE | WAIT; | AWAIT REQUEST FROM VIRTUAL CIRCUIT SERVICES TO SEE IF RATE ADAPTION IS NEEDED. VIRTUAL CIRCUIT SERVICES MUST PASS THE SOURCE EMISSION (E) AND DESTINATION ABSORPTION (A) RATES, AND LCN | 0 | CHECK RA = TRUE | IS RA NEEDED |
| IS R.A. NEEDED | RA ANALYSIS; | D IS THE EFFECTIVE SUBSYSTEM RATE (NOMINALLY SET AT 100 KBITS/SEC) RATE ADAPTION IS NEEDED ONLY WHEN THE DESTINATION ABSORPTION RATE IS THE LIMITING FACTOR. SET RATE ADAPTION REQUIREMENT FLAG | 1 | NEED RA = FALSE | NO RA |
| | | | 2 | NEED RA = TRUE | RA NEEDED |
| NO R.A. | RATE ADAPT = OFF NEED RA = FALSE; | INFORM APPROPRIATE ROUTING ENTITY TO SAY RATE ADAPTION IS NOT NEEDED. RESET RATE ADAPTION FLAG. | 3 | PRESENT STATE ACTION IS COMPLETE | IDLE |
| R.A. NEEDED | RATE ADAPT = ON NEED RA = FALSE START RA TIMER CREDITS = V; | CALCULATE THE NUMBER OF CREDITS V, AND THE PERIOD T FOR ISSUING THEM AND PASS THEM TO THE APPROPRIATE USART ENTITY. RESET RATE ADAPTION FLAG | 4 | PRESENT STATE ACTION IS COMPLETE | IDLE |

*FIG. 7B*

N I/F* TRAFFIC DISTRIBUTION

| PRESENT STATE | PRESENT STATE ACTION | MEANING | ENABLING PREDICATE | | NEXT STATE |
| --- | --- | --- | --- | --- | --- |
| | | | TRANSITION | CONDITION | |
| IDLE | WAIT; | AWAIT INCOMING PACKET OR FIND-LINK-REQUEST FROM VIRTUAL CIRCUIT SERVICES | 0 | INCOMING-PACKET = TRUE | PACKET ANALYSIS 0 |
| | | | 1 | FIND-LINK-REQUEST = TRUE | TX LINK REQUEST |
| PACKET ANALYSIS 0 | PKT ANALYSIS; | DETERMINE WHETHER INCOMING PACKET IS A TRAFFIC REPORT OR A N I/F RESPONSE | 2 | PKT TYPE = TRAFFIC REPORT | UPDATE TRAFFIC REPORT |
| | | | 3 | PKT TYPE = N I/F RESPONSE | DISCARD N I/F RESPONSE |
| TX LINK REQUEST | PKT TYPE = LINK REQUEST; GENERATE PKT; TRANSMIT PKT; START TIMER $T_1$ | ASSEMBLE PKT. AND REQUEST TO MULTICAST LINK REQUEST TO N I/Fs | 4 | PRESENT STATE ACTIONS COMPLETED | WAIT |
| WAIT | WAIT; | AWAIT INCOMING PACKET OR TIMEOUT | 5 | INCOMING PACKET = TRUE | PACKET ANALYSIS 1 |
| | | | 6 | TIMER EXPIRED $T_1$ = TRUE | NO LINK FOUND |
| PACKET ANALYSIS 1 | PKT ANALYSIS; STOP TIMER $T_1$ | DETERMINE WHETHER INCOMING PACKET IS A TRAFFIC REPORT OR A N I/F RESPONSE | 7 | PKT TYPE = N I/F RESPONSE | N I/F WITH LINK FOUND |
| | | | 8 | PKT TYPE = TRAFFIC REPORT | UPDATE TRAFFIC TABLE 1 |

* N I/F REFERS TO A NETWORK INTERFACE DEVICE 20

FIG. 8B

N I/F TRAFFIC DISTRIBUTION

| PRESENT STATE | PRESENT STATE ACTION | MEANING | ENABLING PREDICATE | | NEXT STATE |
|---|---|---|---|---|---|
| | | | TRANSITION | CONDITION | |
| N I/F WITH LINK FOUND | NOTIFY SERVICES; | INFORM VIRTUAL CIRCUIT SERVICES OF THE ID OF THE N I/F WITH THE REQUIRED VIRTUAL LINK | 9 | PRESENT STATE ACTIONS COMPLETED | IDLE |
| UPDATE TRAFFIC TABLE I | UPDATE TABLE; | UPDATE THE TRAFFIC TABLE WITH VALUE GIVEN BY THE TRAFFIC REPORT PACKET | 10 | PRESENT STATE ACTIONS COMPLETED | WAIT |
| NO LINK FOUND | NOTIFY SERVICES; | INFORM VIRTUAL CIRCUIT SERVICES THAT A N I/F WITH THE REQUIRED VIRTUAL LINK HAS NOT BEEN FOUND | 11 | PRESENT STATE ACTIONS COMPLETED | IDLE |
| DISCARD N I/F RESPONSE | RELEASE PKT; | DISCARD N I/F RESPONSE TO AN EARLIER LINK REQUEST/ MULTIPLE RESPONSE | 12 | PRESENT STATE ACTIONS COMPLETED | IDLE |
| UPDATE TRAFFIC TABLE 0 | UPDATE TABLE; | UPDATE THE TRAFFIC TABLE WITH VALUE GIVEN BY TRAFFIC REPORT | 13 | PRESENT STATE ACTIONS COMPLETED | IDLE |

FIG. 8C

CONGESTION DETECTION AND CONTROL 1 OF 5

| PRESENT STATE | PRESENT STATE ACTION | MEANING | ENABLING STATE | | NEXT STATE |
|---|---|---|---|---|---|
| | | | LABEL | CONDITION | |
| CONGESTION FREE | BFREE CHANGED; NORMAL MODE=TRUE; DISCARD FRAMES =FALSE SHARE BUF=FALSE TIMER COUNT=0 TIMER NO=0 | USED BUFFER RESOURCE IS BELOW THRESHOLD. SYSTEM OPERATES IN NORMAL MODE. | 1 | $T_l > b_{FREE}$ | THROTTLE INPUT |
| THROTTLE INPUT | NORMAL MODE=FALSE; START TIMER TL; SHARE BUF=TRUE NL CONTROL: THROTTLE | PROCESSOR IS IN CONGESTION. PRIMITIVE THROTTLE INPUT IS DELIVERED TO LOOP LEVEL 3 WILL INSTRUCT ALL L2 TO SEND OUT THE RNR FRAMES | 2 | PRESENT STATE ACTIONS COMPLETE | THROTTLE INPUT WAIT |
| THROTTLE INPUT WAIT | BFREE CHANGED | AWAIT PROCESSOR TO FREE BUFFERS. MORE DATA COULD BE RECEIVED FROM USART &/OR BUS 30 DUE TO THE TRANS-MISSION LATENCY. USART OUTGOING TRAFFIC AND INCOMING SUPERVISOR FRAMES (E.G. ACK) ARE STILL ENABLED. THE PURPOSE OF TIMER IS TO PROVIDE A HYSTERESIS RESULT. | 3 | TIMER TL EXPIRED; AND $T_l > B_{FREE} > T_2$ | THROTTLE INPUT WAIT TIMER |

FIG. 9B

CONGESTION DETECTION AND CONTROL  2 OF 5

| PRESENT STATE | PRESENT STATE ACTION | MEANING | ENABLING STATE | | NEXT STATE |
| --- | --- | --- | --- | --- | --- |
| | | | LABLE | CONDITION | |
| | | | 4 | TIMER T1 EXPIRED; AND BFREE> T1 | RELEASE INPUT |
| | | | 5 | T2 > BFREE ; | THROTTLE ALL FRAMES |
| THROTTLE ALL FRAMES | START TIMER T2; TIMER COUNT=0 SHARE BUF= TRUE NL CONTROL : THROTTLE LCC; | PROCESSOR IS IN CONGESTION. PRIMITIVE THROTTLE LCC IS DELIVERED TO BUS LEVEL 3 THAT WILL INSTRUCT L2 TO SEND A RNR FRAME TO ALL LINKS | 6 | PRESENT STATE ACTIONS COMPLETED | THROTTLE ALL FRAMES WAIT |
| THROTTLE ALL FRAMES WAIT | BFREE CHANGED: | AWAIT PROCESSOR TO FREE UP BUFFERS. MORE FRAMES COULD BE RECEIVED FROM USART &/OR BUS 30 DUE TO THE TRANS- MISSION LATENCY. ALL OUTGOING TRAFFIC AND USART INCOMING SUPERVISOR FRAMES ARE STILL ENABLED. THE PURPOSE OF TIMER IS TO PROVIDE A HYSTERESIS RESULT. | 7 | TIMER T2 EXPIRED; AND T2 > BFREE>T3 | THROTTEL ALL FRAMES WAIT TIMER |

FIG. 9C

CONGESTION DETECTION AND CONTROL 3 OF 5

| PRESENT STATE | PRESENT STATE ACTION | MEANING | ENABLING STATE | | NEXT STATE |
|---|---|---|---|---|---|
| | | | LABLE | CONDITION | |
| | | | 8 | TIMER T2 EXPIRED; AND $T_1 > B_{FREE} > T_2$; | THROTTLE INPUT WAIT TIMER |
| | | | 9 | TIMER T2 EXPIRED; AND $B_{FREE} > T_1$; | RELEASE INPUT |
| | | | 10. | $T_3 > B_{FREE}$ | DISCARD FRAMES |
| DISCARD FRAMES | DISCARD FRAMES = TRUE; START TIMER T3; TIMER NO = 0; SHARE BUF = FALSE; | NO LEVEL 1 BUFFER SPACE IS ALLOCATED FOR THE RECEIVING CHANNELS. ALL FRAMES TRANSMITTED TO THE P I/F* ARE DISCARDED. | 11 | PRESENT STATE ACTIONS COMPLETE | DISCARD FRAMES WAIT |
| DISCARD FRAMES WAIT | BFREE CHANGED; TIMER COUNT = 0 | AWAIT BUFFER RESOURCES TO FREE | 12 | TIMER T3 EXPIRED; AND $T_3 > B_{FREE}$ | DISCARD FRAMES WAIT TIMER |

\* P I/F REFERS TO A PERIPHERAL INTERFACE DEVICE 18

FIG. 9D

CONGESTION DETECTION AND CONTROL 4 OF 5

| PRESENT STATE | PRESENT STATE ACTION | MEANING | ENABLING STATE | | NEXT STATE |
|---|---|---|---|---|---|
| | | | LABLE | CONDITION | |
| | | | 13 | TIMER T3 EXPIRED; AND $T_2 > BFREE \geq T_3$; | THROTTLE ALL FRAMES WAIT TIMER |
| | | | 14 | TIMER T3 EXPIRED; AND $T_1 > BFREE \geq T_2$ | THROTTLE INPUT WAIT TIMER |
| | | | 15 | TIMER T3 EXPIRED; AND $BFREE \geq T_1$; | RELEASE INPUT |
| RELEASE INPUT | NL CONTROL: RELEASE USART | RELEASE INPUT PRIMITIVE IS DELIVERED TO LOOP L3 TO INSTRUCT L2 TO SEND OUT A RR FRAME THROUGH ALL LINKS. | 16 | PRESENT STATE ACTIONS COMPLETE | CONGESTION FREE |
| THROTTLE INPUT WAIT TIMER | START TIMER T1; TIMER COUNT ++; | RESET T1 TIMER AFTER PREVIOUS TIME OUT | 17 | TIMER COUNT < TIMER MAX | THROTTLE INPUT WAIT |

FIG. 9E

CONGESTION DETECTION AND CONTROL 5 OF 5

| PRESENT STATE | PRESENT STATE ACTION | MEANING | ENABLING STATE | | NEXT STATE |
|---|---|---|---|---|---|
| | | | LABEL | CONDITION | |
| | | | 18 | TIMER COUNT ≥ TIMER MAX | TIMER ERROR |
| THROTTLE ALL FRAMES WAIT TIMER | START TIMER T2; TIMER COUNT ++; CHOKE BL; | RESET T2 TIMER AFTER PREVIOUS TIME OUT | 19 | TIMER COUNT < TIMER MAX | THROTTLE ALL FRAMES WAIT |
| | | | 20 | TIMER COUNT ≥ TIMER MAX | TIMER ERROR |
| DISCARD FRAMES WAIT TIMER | START TIMER T3; TIMER NO ++; CHOKE BL; | RESET T3 TIMER AFTER PREVIOUS TIME OUT | 21 | TIMER NO < TIMER MAX | DISCARD FRAMES WAIT |
| | | | 22 | TIMER NO ≥ TIMER MAX | TIMER ERROR |
| TIMER ERROR | NL ERROR: CONGESTION; | TIME OUT THRESHOLD IS EXCEEDED. PRIMITIVE TIMER ERROR WILL BE DELIVERED LEVEL 3. UPON RECEIVING THE PRIMITIVE, L3 WILL TEAR DOWN n NUMBER OF V.C. | 23 | PRESENT STATE ACTIONS COMPLETE | THROTTLE ALL FRAMES WAIT |

FIG. 9F

DATA SUBSYSTEM TRAFFIC CONTROL APPARATUS AND METHOD

CROSS-REFERENCE TO RELATED APPLICATIONS

This applicaiton is related to one, or more, of the following U.S. patent application Ser. Nos. 670,682; 670,701 both filed on Nov. 13, 1984, Ser. Nos. 705,456; 705,457; 705,458; 705,459; 705,460; 705,461; 705,462; 705,463; 705,464 all filed on even date herewith. All of the above applications are assigned to the assignee hereof.

BACKGROUND OF THE INVENTION

The present invention generally relates to an apparatus for controlling data traffic across a data subsystem and, in particular, relates to such a subsystem including a plurality of interconnected but independent means for autonomously controlling the flow of data traffic thereacross.

In the general field of modern communications systems, a data communication network is frequently formed by interconnecting a plurality of subsystems, or nodes. Conventionally, each subsystem, or node, is designed to support a prespecified capacity of data traffic. This capacity is normally dependent upon the subsystem hardware and the number of network connections throughout the network. Consequently, in the early stages of the design of a particular subsystem and/or network, one of the more critical issues to be resolved is the data flow capacity requirements of the end users. Without question, subsystems and networks can be designed to handle just about any prespecified data flow capacity. However, a major difficulty lies in the unanticipated increase in data handling requirements of the users after the network is installed.

Hence, when the data handling requirements of a network exceeds the anticipated, or design, levels thereof, a user must either commit to an expensive system redesign or suffer with reduced services.

Another common difficulty of modern subsystems is that, occasionally, during peak use by a small number of subscribers the remaining subscribers are either denied access to the network completely or are subjected to ergonomically unacceptable delays.

Considering the present growth in data transport technology in such fields as computers, microcomputers, electronic mail and so on, the demands upon data communication networks and the subsystems interconnected thereto has escalated far beyond anticipated levels. Such technological growth is anticipated to continue to outstrip the present day communication network designs.

In addition, many individual subscribers to such networks are requiring increased services. Further, numerous services are presently available to supply subscribers with such services as electronic mail, data bases of information, for example, in such fields as finance, law, business, chemistry, and numerous others. Consequently, more and more users are facing the difficulties discussed above.

In light of the above, it is clear that a growing need exists for a subsystem that is both autonomously adaptable to data traffic flow and inexpensively predesigned and adapted for modular expansion.

SUMMARY OF THE INVENTION

Accordingly, it is one object of the present invention to provide a subsystem apparatus that autonomously adapts to the data traffic flow thereacross and a method for use with such a subsystem.

This object is accomplished, at least in part, by a subsystem having a plurality of devices each autonomously regulating the data flow thereacross and wherein the network is provided with the means for automatically programming new modular devices as each is introduced into the subsystem.

Other objects and advantages will become apparent to those skilled in the art from the following detailed description read in conjunction with the appended claims and the drawings attached hereto.

BRIEF DESCRIPTION OF THE DRAWINGS

FIGS. 1, 1A, 1B are block diagrams of a data communication network having a plurality of subsystems interconnected thereby and embodying the principles of the present invention;

FIG. 2 is a more detailed block diagram of the data transport controller shown in FIG. 1;

FIGS. 7A and 7B depict a state diagram and associated state table for a rate adaptation function;

FIGS. 8A-8C depict a state diagram and associated state tables for a traffic distribution function; and FIGS. 9A-9F depict a state diagram and associated state tables for a congestion detection and control function.

DETAILED DESCRIPTION OF THE INVENTION

Figure 1B:
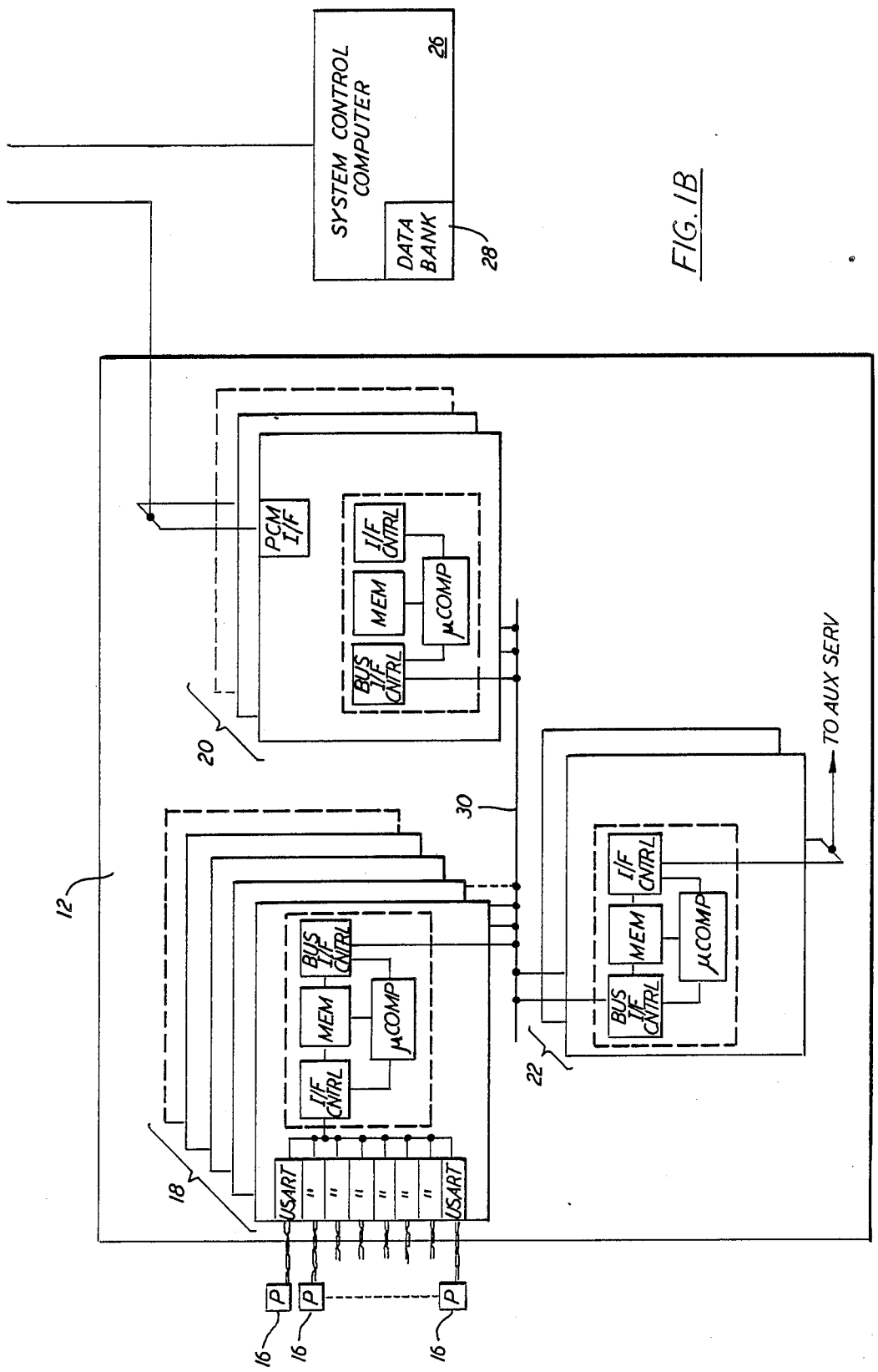

A communication network, generally indicated at 10 in FIG. 1 and embodying the principles of the present invention, includes a plurality of substantially identical subsystems 12 interconnected to a networking medium 14 whereby communication is established between and among peripherals 16 interconnected to each subsystem 12. In one embodiment the networking medium 14 is a digital switching network such as the ITT SYSTEM 12 digital exchange.

In the preferred embodiment, each subsystem 12 includes one or more peripheral interface device 18, one or more network interface device 20, and a one or more gateway interface device 22. In addition, at least one of the subsystems 12 further includes a network control interface device 24 that, as more fully discussed below, interfaces with a system control means 26. The system control means 26 being operative to control a data bank 28 having stored therein, inter alia, all operative communication protocols for the communication network 10. Further, the peripheral interface devices 18, the network interface devices 20, the gateway interface devices 22 and, when present, the network control interface device 24 of each subsystem 12 are all interconnected by a multiple access masterless contention bus 30 having collision detection. The contention bus 30, hereinafter referred to as the intrasubsystem bus 30, thus establishes a communication path between and among all devices, 18, 20, 22 and 24, within each subsystem 12. Thus, the system control means 26 has access, via the network control interface device 24, to every subsystem 12 via the networking medium 14.

Each peripheral interface device 18 includes a data transport controller 32 that interfaces with the plurality of peripherals 16 via a plurality of universal synchronous/asynchronous receiver/transmitter (USART) devices 34. Each network interface device 20 includes a data transport controller 32 that interfaces with the networking medium 14 via a PCM interface device 36. Further, each gateway interface device 22 and network control interface device 24 also include such data transport controllers 32. Preferably, each subsystem 12 is of the type described and discussed in U.S. patent application Ser. No. 705,464 entitled "Communication Subsystem" filed on even date herewith and assigned to the assignee hereof. This application is deemed incorporated herein by reference. Further, each data transport controller 32, for each device 18, 20, 22 or 24, is substantially identical with every other such data transport controller 32 throughout the network 10. The primary difference among the data transport controllers 32, as more fully discussed below, is the traffic control tasks assigned thereto. Thus, each subsystem 12 has a fully distributed multi-microcomputer architecture.

Referring to FIG. 2, a more detailed block diagram of a data transport controller 32 and, as shown, includes a peripheral interface controller 38, a communication bus interface 40, a microcomputer 42 and a storage medium 44. In the preferred embodiment, the peripheral interface controller 38 is adapted to service a plurality of peripherals 16 operating according to the same communication protocol. Such a peripheral interface controller 38 includes both a general peripheral control program and a device specific subprogram adapted to allow intercommunication to each of various types of peripherals 16 according to the individual operating requirements thereof. One particular peripheral interface controller 38 specifically adapted to provide such services is fully described and discussed in U.S. patent application Ser. No. 705,458 entitled "Device Interface Controller" filed on even date herewith and assigned to the assignee hereof. This application is deemed incorporated herein by reference.

Figure 3:
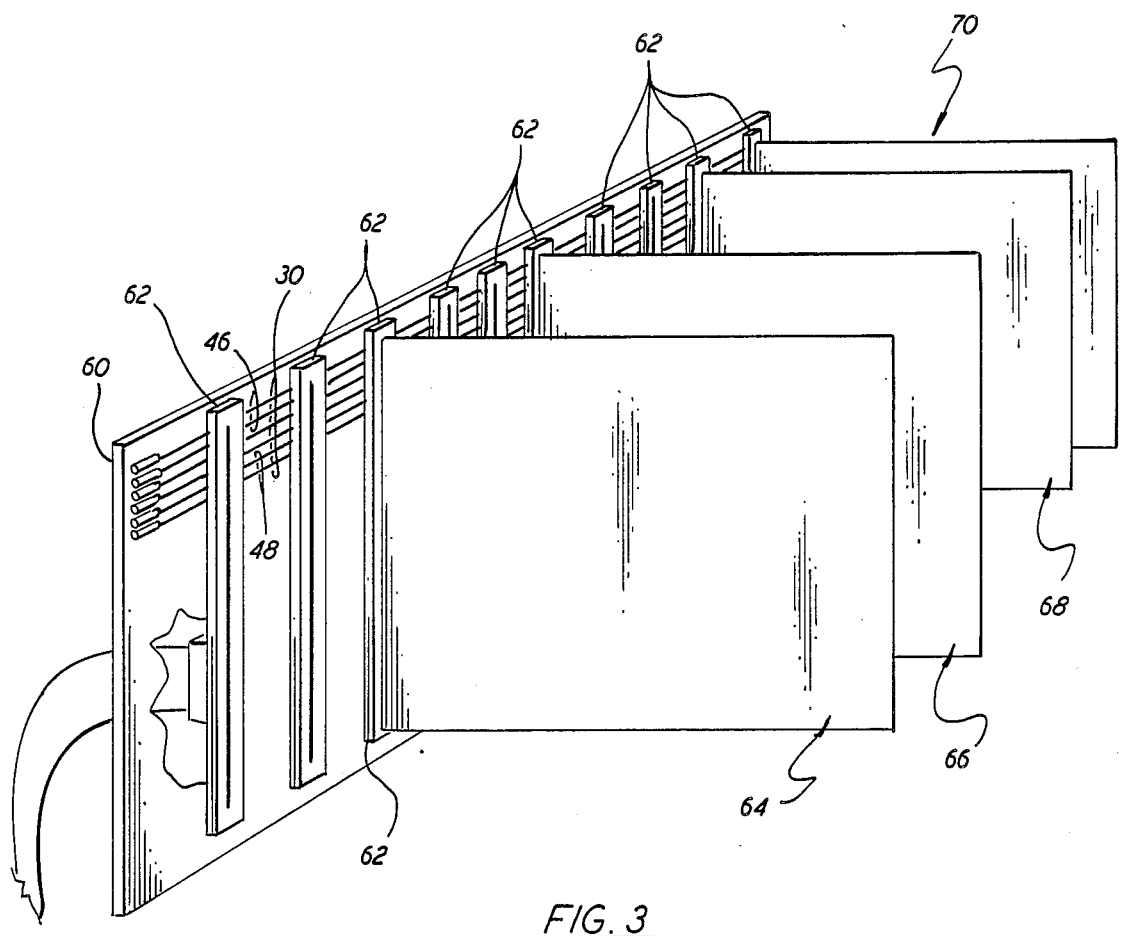
FIG. 3 is a pictorial of one implementation of the subsystem shown in FIG. 1.

In the preferred embodiment, the communication bus interface 40 interfaces with the masterless multiple access contention bus 30 with collision detection having a first bus 46, shown more clearly in FIG. 3, for sustaining data transmissions therealong and a second bus 48, distinct from the first bus 46, provided solely for collision detection.

Examples of such an interface 40 and bus 30 are described and discussed in U.S. patent application Ser. Nos. 670,682 and 670,701 entitled "Apparatus for Masterless Collision Detection" both filed on Nov. 13, 1984 and assigned to the assignee hereof. These applications are deemed incorporated herein by reference.

The microcomputer 42 preferably includes a microprocessor 50, a read-only-memory (ROM) 52, a random-access-memory (RAM) 54 and a means 56 for providing local services, such as high level protocol conversions that are relatively infrequently required, for example, for providing gateway functions. The microprocessor 50, the ROM 52, the RAM 54 and the means 56 are interconnected via the local bus 58 of the microcomputer 42. Preferably, the microcomputer 42 is directly connected to the peripheral interface controller 38 and the communication bus interface 40 only for the exchange of interrupt and channel attention signalling via lines, 60 and 62, respectively. Preferably, the microcomputer 42 is a high capacity mirrocomputer, such as the 80186 microprocessor device, manufactured and marketed by INTEL Corporation of Santa Clara, Calif. Such a microcomputer 42 includes sufficient capacity to execute the requisite single protocol conversion and to regulate the data traffic thereacross. An apparatus and method for providing a peripheral interface device 18 for each external protocol is described and discussed in U.S. patent application Ser. No. 705,461 entitled "Apparatus and Method for Executing Communication Protocol Conversions" filed on even date herewith and assigned to the assignee hereof. This application is deemed incorporated herein by reference. One data transport controller 32 particularly adapted for use in the present network 10 is described and discussed in U.S. patent application Ser. No. 705,457 entitled "Data Transport Control Apparatus" filed on even date herewith and assigned to the assignee hereof. This application is deemed incorporated herein by reference.

In one preferred implementation, shown in FIG. 3, a subsystem 12, designed according to the principles of the above-referenced U.S. patent application Ser. No. 705,464 entitled "Communication Subsystem" includes a printed circuit board mainframe 60, having means 62 for accepting a plurality of printed circuit boards therein. The printed circuit board mainframe 60 preferably includes the intrasubsystem bus 30 etched thereinto. Further, each peripheral interface device 18, each network interface device 20, each gateway interface device 22 and the network control interface device 24 is self-contained on separate printed circuit boards, 64, 66, 68 and 70, respectively. Hence, in this embodiment, the subsystem 12 is substantially completely self-contained and is, for all intents and purposes, prewired to be modularly expanded. Thus, any peripheral 16 operating under a previously unavailable communication protocol can be accommodated simply by the insertion of a printed circuit board carrying a new peripheral interface device 18 dedicated to only that protocol. Consequently, each subsystem 12 and the entire network 10 are easily expanded without reprogramming or redesigning the entire system. Naturally, depending upon the number of peripherals 16 having the same communication protocol to be connected, more than one peripheral interface device 18 can be provided for executing any specific communication protocol conversion. Thus, each subsystem 12 includes the means 62 for accepting additional peripheral interface devices 18 whereby additional peripheral devices can be added and interconnected to the intrasubsystem bus 30. Further, each subsystem 12, as discussed above, includes a means 62 for providing additional network interface devices 20 whereby the total traffic flow capacity through the subsystem 12 can be increased in a modular fashion.

Figure 4:
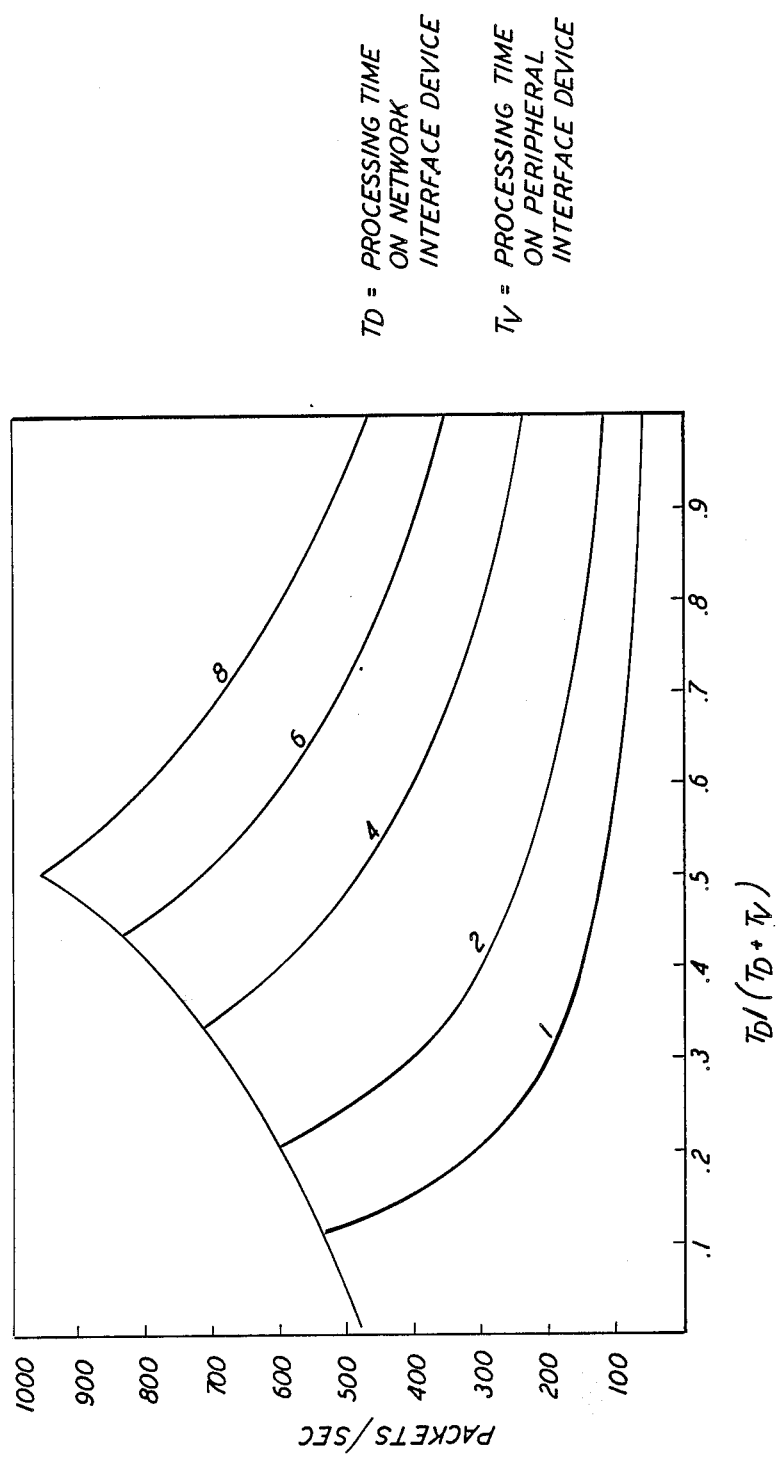
FIG. 4 is a graphic illustration of total subsystem throughput as a function of processing time for a fixed number of peripheral interface devices and varying numbers of network interface devices.
Figure 5:
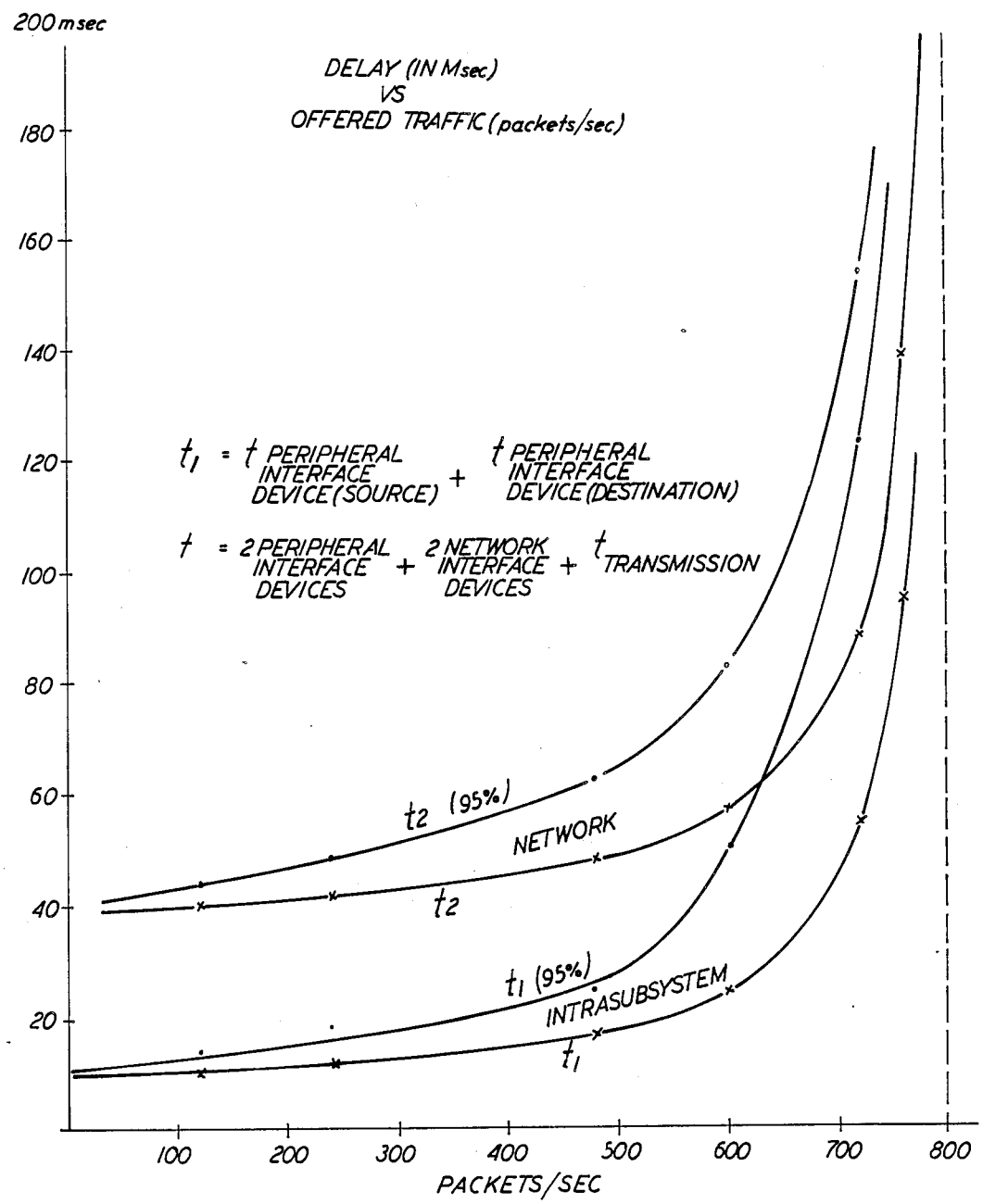
FIG. 5 is a graphic illustration of delay characteristic versus offered packet traffic.

The benefits derived from this implementation are graphically illustrated in FIG. 4 where the total subsystem throughput, in packets/second, is shown as a function of the proportion of processing time per packet between the network interface device 20 and the processing time per packet for the peripheral interface device 18 and the number of network interface devices 20 in that subsystem 12. The various delay characteristics associated with offered packet traffic for intrasubsystem transport, using the intrasubsystem bus 30, and the intersubsystem transport, using the networking medium 14 is depicted in FIG. 5.

In one preferred embodiment, the network 10 includes a uniform communication protocol for intrasubsytem data communication and for intersubsystem data communication via the network medium 14, the communication protocol being stored in the data bank 28 for downloading into the RAM 54 of the data transport controller 32 of any peripheral interface device 18 or any network interface device 20 introduced into the network 10.

In one embodiment, the system control means 26 can be a personal computer, or the functional equivalent thereof, having the data bank 28 stored, for example, on a floppy disk. The system control means 26 is adapted to monitor the status of each device, 18, 20 and 22 in each subsystem 12. The downloading to newly inserted devices is initiated according to a preprogrammed portion of the ROM 52 of every data transport controller 32 that, upon insertion into the means 62, alerts the system control means 26. The system control means 26 then downloads the appropriate software program into the RAM 54. The system control means 26, during the monitoring of the devices 18, 20 and 22, ensures that the newly inserted device 18, 20 or 22 is acknowledged by the remainder of that subsystem 12. Such programming for effecting a program downloading is within the skill of those familiar with the software arts.

Figure 6:
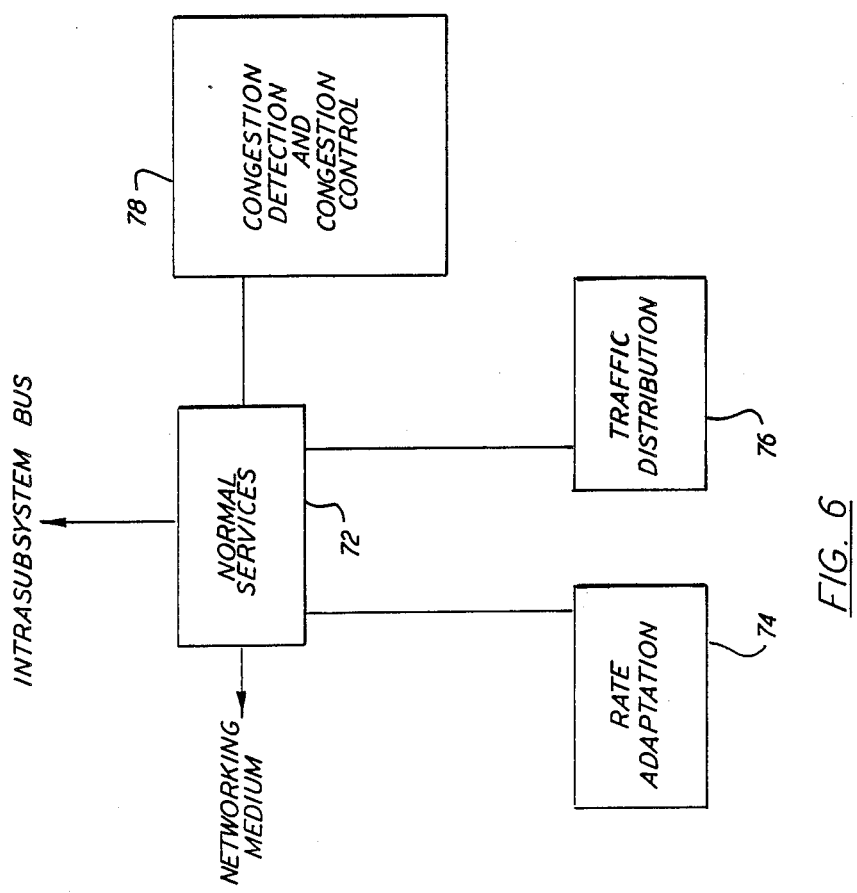
FIG. 6 is a functional block diagram of the mechanisms provided by each microcomputer of a subsystem having a multi-microcomputer architecture.

A functional block diagram of the primary traffic control mechanisms provided is shown in FIG. 6. It will be understood that, due to the multi-microcomputer distributed nature of each subsystem 12, by the provision of a common data transport controller 32, each such controller 32 is provided with only those functions necessary to the operation thereof. For example, each peripheral interface device 18 includes those functions relating to intrasubsystem data transport and data transport with a peripheral 16 but not functions relating to the data traffic across the networking medium 14. However, because of the commonality and distribution of the data transport controllers 32, a uniform nested-layered communication protocol is provided. The provision of such a uniform network-wide communication protocol further enhances the autonomous traffic control by each device 18, 20 and 22, and, hence, each subsystem 12. Preferably, the communication protocol is based on the Open System Interconnection model of the International Standards Organization (hereinater OSI-ISO) and provides the first three level services thereof. As shown in FIG. 6, in addition to the normal services, designated at 72, each data transport controller 32 is provided with, rate adaptation 74, traffic distribution 76 and congestion detection and congestion control 78 functions.

The normal services take advantage of the, effectively, independent access to the storage medium 44 of each data transport controller 32 by the bus interface 40 and the peripheral interface controller 38 to dynamically assign the medium 44 on a demand basis. Thus, each channel transferring information via any storage medium 44 throughout each subsystem 12 is assigned memory according to its instantaneous need rather than on a fixed block basis. Hence, congestion is, in many cases, avoided where it would normally occur due to exceeding an assigned fixed block of memory during times when other preassigned fixed blocks of memory were empty or only partially full.

Figure 7A:
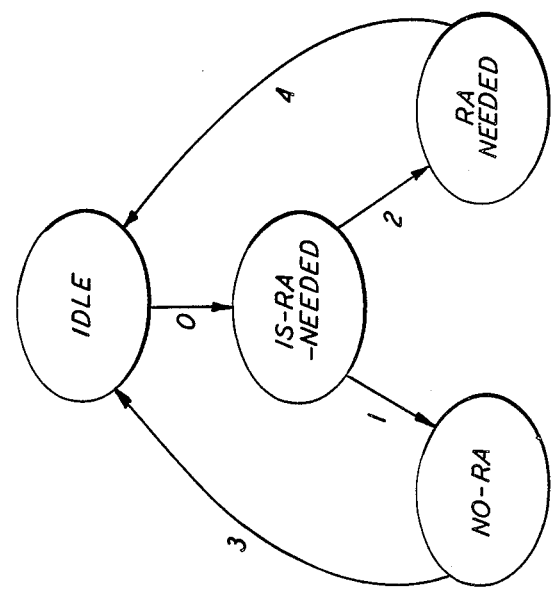

The rate adaptation function 74 is downloaded into every data transport controller 32 at each peripheral interface device 18 throughout the network 10. Preferably, the rate adaptation function 74 is implemented according to the state machine diagram shown in FIG. 7A based on the state table, shown in FIG. 7B and in accordance with the following definitions:

| RATE ADAPTION: Variable Definitions | |
|---|---|
| check-RA | a flag to indicate a request by the virtual circuit services machine to see if RA is needed. |
| need-RA | an internal flag which is set/reset by the procedure RA analysis to indicate whether RA is needed or not. |
| V | number of credits. |
| T | period of issuing credits. |
| Rate__Adapt | flag assigned to each logical channel number to indicate whether Rate-Adaption is needed or not on that virtual circuit. |
| credits | number of packets permitted to be transmitted within a time. |
| RATE ADAPTION: Procedure Definitions | |
| wait | await enabling predicate conditions to be satisfied. |
| RA-analysis | performs a comparison of the data subsystem rate D, the source emission rate E and the destination absorption rate A to see if RA is needed. |
| forward-USART | forwards RA parameters V, T to given USART entity. |
| start__RA__timer | starts Rate Adaption timer for the first time, subsequent resets are done by appropriate routing machine. |

The rate adaptation function 74 is provided to equalize the data transfer rate between a fast data rate source and a slow data rate destination. Such a function more efficiently utilizes all commmunication links throughout the network 10.

Figure 8A:
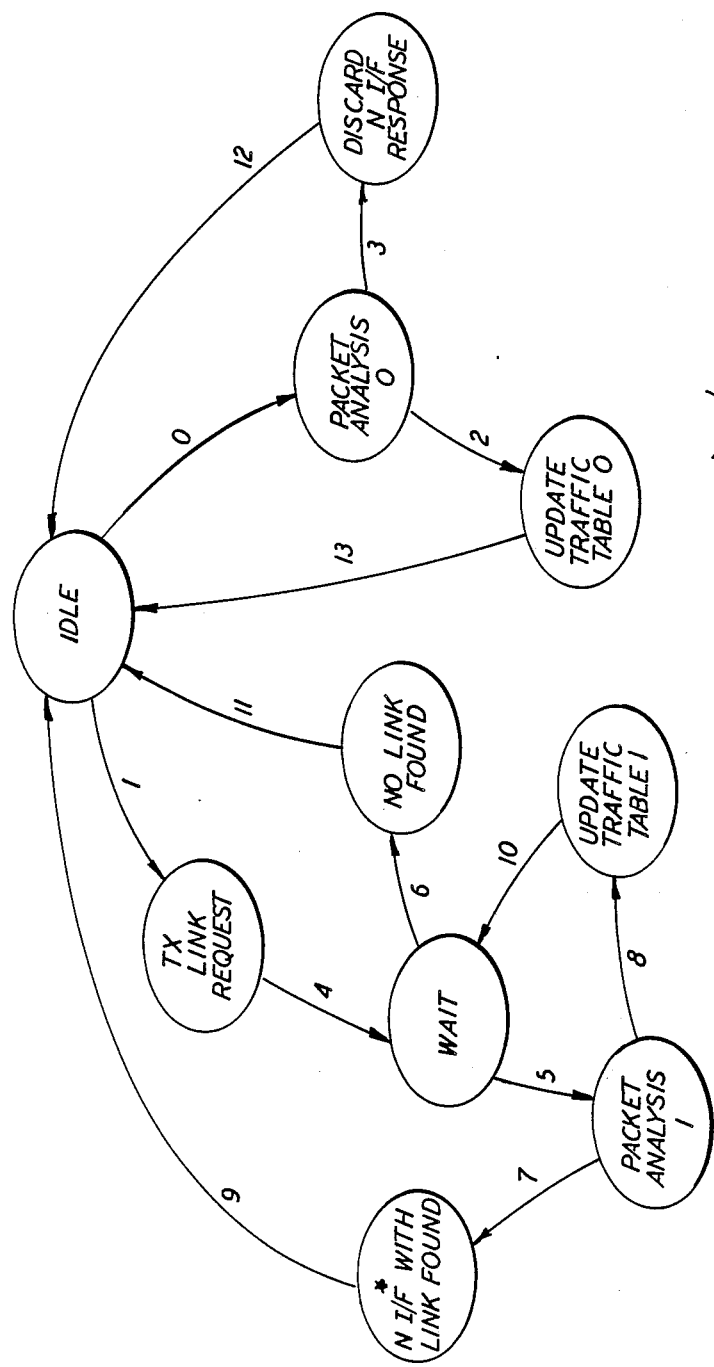

Preferably, the traffic distribution function 76 is implemented according to the state machine diagram shown in FIG. 8A based on the state tables of FIGS. 8B and 8C and in accordance with the following dictionary:

| NETWORK INTERFACE DEVICE TRAFFIC DISTRIBUTION: Variable Definitions | |
|---|---|
| incoming__packet | flag which indicates the reception of a packet by the state machine. |
| find__link__request | flag which is set to indicate a request by the virtual circuit services machine to find a virtual link to another subsystem. |
| pkt__type | a variable which indicates the type of packet internal to this state machine; could be TRAFFIC__REPORT or network interface device RESPONSE. |
| timer__expired T1 | flag which indicates that the timer T1 has expired. |
| NETWORK INTERFACE DEVICE TRAFFIC DISTRIBUTION: Procedure Definitions | |
| wait | await one of the enabling |

| | |
|---|---|
| pkt__analysis | predicate conditions to be satisfied. determines the type of incoming packet (internal to this state machine) i.e. TRAFFIC__REPORT or network interface device__RESPONSE. |
| generate__pkt | form a LINK__REQUEST packet. |
| transmit__pkt | request bus 30 to multicast packet to all Network Interface Devices on bus 30. |
| start__timer__T1 | initiate timer to limit the spent waiting for a Network Interface Device. |
| stop__timer__T1 | extinguish the T1 network interface device RESPONSE timer initiated by the start__timer procedure. |
| notify__services | informs virtual circuit services machine the ID of the network interface device with the required virtual link or that virtual link was not found. |
| update__table | updates the network interface device traffic table with the information received in a TRAFFIC__REPORT. |
| release__pkt | flush buffers associated with packet and return these to the free buffer. |

The traffic distribution function 76, for example, across the network interface devices 20 on opposite sides of the networking medium 14 relies on status reporting between the data transport controllers 32 interconnected via the intrasubsystem bus 30. This reporting allows identification of the least loaded network interface device 20 in a subsystem 12. To distribute load uniformly among network interface devices 20 in the involved subsystem 12, a new virtual link is established between the least loaded network interface device 20 in each of the subsystems 12.

Figure 9A:
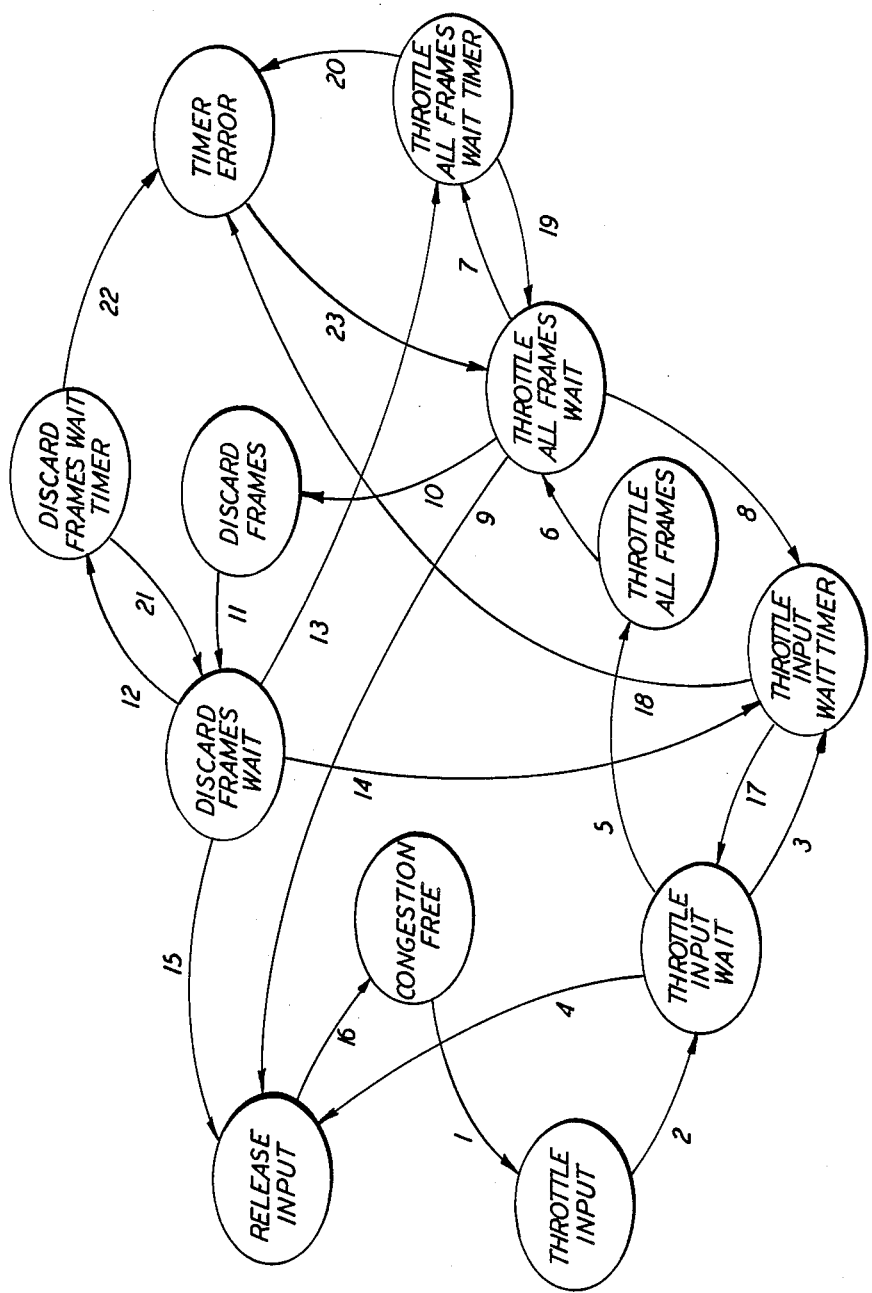

The congestion detection and control function 78 is downloaded into each data transport controller 32 and preferably is implemented according to the state diagram shown in FIG. 9A based on the state tables of FIGS. 9B–9F and in accordance with the following dictionary:

CONGESTION DETECTION AND CONTROL

Variable Definition

The following definitions describe the variables and procedures of the congestion detection and control which are used in the state machine transition tables.

| | |
|---|---|
| $T_1$ | Threshold to throttle the input traffic. |
| $T_2$ | Threshold to throttle all incoming links (where $T_2 < T_1$). |
| $T_3$ | Threshold of discard frames (where $T_3 < T_2$). |
| $b_{free}$ | Denotes total processor free buffers. This variable is updated by the buffer allocation/deallocation routines on real time. |
| $b_{free}$__changed | Denotes the procedure that the buffer resource is changed. Both buffer allocation and deallocation are the algorithms contributes to the $b_{free}$ changed. |
| normal__mode | Processor always runs in normal mode unless the congestion detection algorithm shows the resource is under congestion (e.g. throttle input, discard input, or discard all). Under this mode, all system resource is shared. |
| start__timer__t1 | A timer is started after a choke packet is sent to all USART links. The purpose is that the choke packet will stop the traffic source only for t ms (where $t > t1$). After t1 ms later, the freed processor buffer still under the threshold ($T_1$), the processor will send out another choke packet to rethrottle the traffic source. |
| start__timer__t2 | A timer is started after a choke packet is sent to all USART links and intrasubsystem bus links. The purpose is that the choke packet will stop the traffic source only for $t_2$ ms. After $t_2$ ms later, the freed processor resource still under the threshold, the processor will send out another choke packet to rethrottle the traffic source. |
| start__timer__t3 | A timer is started after a processor is entering into discard frame mode. After $t_3$ ms later, the freed processor resource could switch to release input, throttle input or throttle all frames state. |
| timer max | Maximum number of timeout can be accepted. |
| timer__count | A variable keeps track of the number of throttle all frames wait timeouts. |
| timer__no | A variable keeps track of the number of discard wait timeouts. |
| NL-ERROR:CONGESTION | Time error will be reported due to the error threshold is exceeded. Upon receiving the report, virtual circuits will be selectively torn. |
| share__buf | When the processor resource is in throttle input or throttle all frame mode, a set of buffers is shared among all USART channels. These buffers are not assigned to any specific USART channel. Whenever a USART sends a frame, the controller 32 will deliver an out-of-buffer interrupt to local processor and local processor will allocate adequate buffers to the interrupting channel. Whenever the USART retransmits the frame again, the receive channel is ready to accept the frame. In summary, the notion is to share limited buffers among 16 USART channels during the congestion. |

CONGESTION DETECTION AND CONTROL: Procedure Definitions

| | |
|---|---|
| discard__frames | Whenever the variable is turned on, there is no buffer assigned to level 1 buffer space. Any frames which destinate to the subsystem are implicitly discarded due to lack of buffers. |
| throttle__USART | A RNR frame is sent to all USART channels. The throttle is based on the virtual link, not based on the virtual circuit. |
| throttle__bus | A procedure delivers a primitive to bus 30. Upon receiving the primitive, the bus 30 sends out a broadcast choke message to all links. |
| release__USART | A primitive delivered to |

| -continued |
|---|
| USART. Upon receiving the primitive, the USART sends out RR frame to clear the busy condition. |

In the preferred embodiment, the first congestion in the system is defined as the operational point of offered traffic to a data transport controller 32 wherein the available free buffer in the storage medium 44 thereof approaches complete utilization. If this is allowed to continue with increasing offered traffic the performance of that data transport controller 32 would degrade as a result of lost packets due to unavailable memory and also the potential for deadlock would also occur. Therefore, congestion detection consists of monitoring the size of the free buffer in the storage medium 44 with respect to three thresholds. When the size of the buffer is below the first threshold the congestion control mechanism throttles new input traffic. When the buffer size falls below the second threshold then transit traffic is throttled. In the first case though input traffic was throttled; transit traffic was not affected for the reason of attempting to provide service to those packets that have already been partially serviced.

If the free buffer size falls below a third threshold then virtual circuits are torn down and packets may be discarded. For peripheral interface devices 18, input traffic is from the external peripherals 16 and transit traffic comes from the intrasubsystem bus 20. The network interface devices 16 have input traffic from the intrasubsystem bus 20 and transit traffic from the networking medium 14.

The above-described subsystem 12 is responsive to the growing need for the inexpensive expansion of subsystems 12 connected to a communications network 10, while avoiding a complete system redesign. Thus, the fact that, in any given subsystem 12, certain paths are more heavily used than others and the fact that it is not predeterminable which paths are to be the heaviest used and, additionally, the fact that the location of the heaviest used paths changes, does not affect the present subsystem 12. That is, the traffic flow across a subsystem 12 having, inter alia, a plurality of network interface devices 20 is both autonomously and automatically distributed by each network interface device 20 therein.

The communication system 10 as described herein is applicable to almost any type of network. Example of such applications can be found in U.S. patent application Ser. Nos. 705,462, 705,463 and 705,460, entitled "System For Providing Data Services To A Circuit Switched Exchange", "Data Communication Network" and "Full Service Voice/Data System" respectively, all filed on even date herewith and assigned to the assignee hereof. These applications are deemed incorporated herein by reference. The referenced application Ser. Nos. 705,462 entitled "System For Providing Data Services To A Circuit Switched Exchange" describes and discusses the provision of data services, via a data services adjunct, to subscribers of a circuit switched exchange. The data services adjunct therein is, essentially, comparable to the autonomous subsystem 12 having a multi-microcomputer architecture described herein. The referenced application Ser. No. 705,463 and 705,460 entitled "Data Communication Network" and "Full Service Voice/Data System" respectively describe and discuss a data only network and an integrated full service voice/data network respectively. Each of these networks can be designed to include autonomous subsystems embodying the principles of the present invention.

The present apparatus has been described with reference to a particular exemplary embodiment and is not intended to be limiting as other arrangements and configurations may be made without departing from the spirit and scope of the present invention. Consequently, the present invention is deemed limited only by the attached claims and the reasonable interpretation thereof.

What is claimed is:

1. Apparatus for data traffic control throughout a multisubsystem communications network of the class having a plurality of substantially identical subsystems interconnected to a network medium, with each subsystem associated with a given number of peripherals wherein said plurality of subsystems are controlled by a system control computer having associated therewith a data bank for storing therein operative communications protocols for said communications network comprising:
   a given number of network interface devices associated with each subsystem of said network, each of said network interface devices being substantially indentical in configuration in each of said subsystems and each operative to transmit and receive data from said network medium and each operative to communicate with others of said network interface devices within a given subsystem via a subsystem bus to which bus each network interface device in said given subsystem is connected, each network interface device including:
   means for monitoring the data flow through each network interface device in a given subsystem to provide an indication of data flow through each of said network interface device;
   means for storing for each of said network interface devices a series of preselected data flow rate threshold levels for comparing a selected level with said indication of data flow and for providing a control output signal when said threshold level is exceeded;
   means responsive to said control signal to transmit new data directed at a network interface device providing said control output signal to another network interface device within said subsystem as connected to said data bus, whereby the data load in each subsystem will be distributed relatively equally among said given number of network interface devices in said subsystem.

2. The apparatus according to claim 1 wherein at least one of said network interface devices in one of said subsystems further includes memory means for storing therein said operative communications protocols as downloaded by said system control computer.

3. The apparatus according to claim 2 wherein said given number of network interfaces is N an integer greater than one and as N increases the total traffic capacity of said subsystem increases.

4. The apparatus according to claim 2 wherein said series of preselected data flow rate threshold levels are three levels with a first level indicative of the data flow rate on said subsystem bus, with a second level indicative of data flow from said network medium and with said third threshold level indicative of data flow on both said subsystem bus and said network medium.

5. The apparatus according to claim 1 further including:
a plurality of peripheral interface devices each of said devices coupled to a number of peripherals for each subsystems wherein said plurality of peripheral interface devices accommodate said given number of peripherals in each subsystem, with each said peripheral interface devices coupled to said subsystem bus to enable any one of said peripheral interface devices to provide data flow via any one of said network interface devices and wherein said means for monitoring said data flow monitors said data flow from said peripheral interface devices to distribute said data flow relatively equally among said network interface devices.

6. The apparatus according to claim 5 wherein at least one of said peripheral interface devices includes memory means for storing therein said operative communications protocol as downloaded by said system control computer.

7. A method of controlling data flow through a subsystem of a communications network, said subsystem having a plurality of network interface devices, said network operating in accordance with a given communication protocol, said method comprising the steps of:
providing, on each said network interface device, a data transport controller having a memory for storing in memory in such transport controller a preselected data flow threshold;
generating a control signal when data traffic through one of said interface device exceeds said stored preselected data flow threshold;
transferring, when said control signal is generated from said one network interface device, all new data input requests to said one device to another said network interface device within said subsystem; and
reducing, in response to a second control signal from any other one of said network interface devices, data flow across all said network interface devices within said subsystem.

8. Method as claimed in claim 7 comprising the further steps of:
providing a system data bank for storing said communication protocol, said protocol being uniform for each said network interface device in said plurality.
introducing an additional network interface device into said subsystem; and
loading, from said data bank into a preselected memory position of said data transport controller on said additional network interface device, said communication protocol, whereby the total data flow capacity through said subsystem is expanded.

9. Method as claimed in claim 8 comprising the further step of:
providing an identical program memory on each network interface device in said network whereby said communication protocol is uniform throughout said network.

10. Method as claimed in claim 7 comprising the further step of:
interconnecting a plurality of peripheral interface devices to each said network interface device.

11. Method as claimed in claim 10 comprising the further step of:
reducing, in response to said network interface device data flow reducing step, data flow across each said peripheral interface device.

* * * * *